United States Patent Office 3,493,419
Patented Feb. 3, 1970

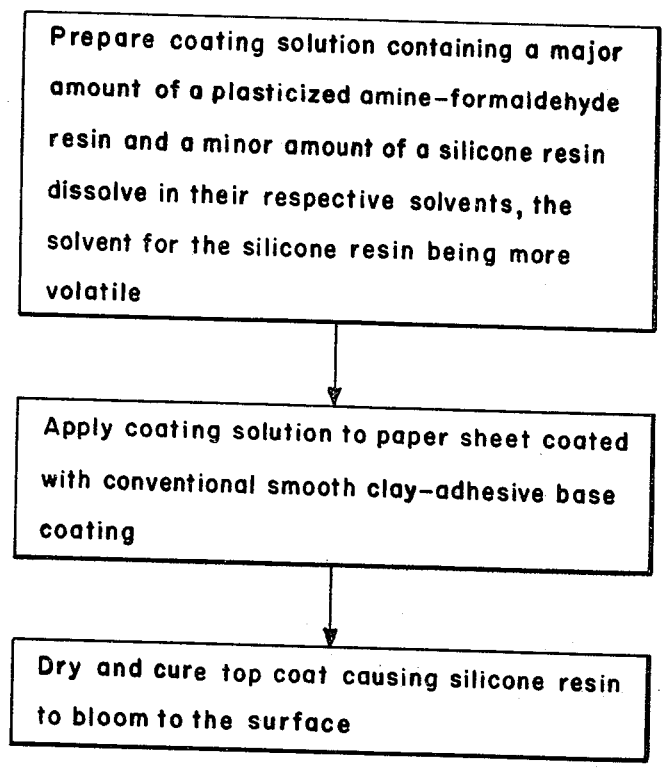

3,493,419
RELEASE PAPER FOR CASTING URETHANE RESINS AND PROCESS FOR MAKING SAME
Robert Lewis Jones, Gorham, N.H., and James G. Murphy, Annandale, Va., assignors, by mesne assignments, to Scott Paper Company, Delaware County, Pa., a corporation of Pennsylvania
Filed Apr. 5, 1967, Ser. No. 628,582
Int. Cl. B44d 1/14; C08d 13/16
U.S. Cl. 117—76    7 Claims

ABSTRACT OF THE DISCLOSURE

A release paper particularly suited for casting urethanes has a solvent applied top coating consisting of (1) a known amine-formaldehyde resin plasticized with a phthalic alkyd resin admixed with (2) a minor amount of silicone resin that has been caused to bloom to the surface of the top coating during the evaporation of the solvents for the resins. The coating has the gloss and hardness associated with the amine-formaldehyde resin combined with the good release for urethane provided by the silicone resin.

BACKGROUND OF THE INVENTION

Release papers and their uses are well known. See for example U.S. Patent Nos. 2,556,678, 2,565,491, 2,869,722, 2,940,875, 2,995,467, 3,046,160 and 3,050,411, the disclosures of which, especially with regard to the substrates that may be used, are hereby incorporated by reference.

A melamine formaldehyde-alkyd resin lacquer type of release coating gives a surface that has a high gloss but the coating releases poorly from most urethane resins. A release coating of a silicone resin gives good release from the urethane resins, but the gloss of such coatings is very poor.

SUMMARY OF THIS INVENTION

It has now been found that a release paper can be prepared having the gloss, hardness, flexibility and other properties of the amine-formaldehyde-alkyd resin type coatings and the good release to urethanes of the silicone resin type coatings by admixing the two resins in a release coating solution that contains a solvent for each of the resins, with the solvent for the silicone resin being relatively more volatile so that during drying and curing of the release coating the silicone resin comes out of solution first as the solvent evaporates and blooms to the surface, i.e., its concentration at the surface is substantially greater than its concentration in the body of the release coating. Only a small amount of the silicone resin relative to the amine-formaldehyde resin is used, but its effective concentration at the surface of the release coating is such that easy release from urethane resins cast on the release paper is achieved. The solvents for the resins can be mutually compatible or a third solvent can be used to make them compatible. A third solvent can also be used to control solids content, coating viscosity, and other physical properties. Preferably the coating solution contains polymerization catalysts for each of the resins, as are known.

The mechanism of this invention for obtaining a higher effective concentration of one film-forming resin over another from a release coating solution containing the two can be used with incompatible film-forming resins other than the urea-formaldehyde and silicone resins described above.

THE DRAWING

The drawing is a self-explanatory flow diagram showing the steps for forming a release paper in accordance with the teachings of this invention.

PREFERRED EMBODIMENT

The base paper or bodystock can be any paper commonly used as a base for high-grade coated printing papers. For example, a sheet of 80 pounds weight per 25 x 38 inch, 500 sheet ream, made from a moderately beaten furnish of about equal quantities of bleached softwood and hardwood fibres containing a small quantity (e.g. 5% based on the fibre) of clay filler and moderately sized with rosin.

The bodystock is base coated on both sides by means of a conventional roller coater with about 8½ pounds per side, dry weight, of an aqueous coating composition containing 100 parts of clay, 1 part of TSPP, and 19 parts of soy protein dispersed by ammonium hydroxide. The coated web is then dried and supercalendered in conventional fashion.

Thereafter a second, or intermediate, coating is applied to one side of the web. For very best results (i.e. for highest gloss) a cast coating is applied. Any known cast coating process can be used, and any conventional cast coating composition can be used, provided the adhesive content is raised somewhat above the minimum quantity required for letterpress printing. As is known, the higher adhesive content is desired to prevent undue penetration of the subsequently applied release coating.

A suitable intermediate coating composition is an aqueous composition of about 45% solids content comprising 100 parts clay, 17 parts casein, 7 parts butadiene-styrene copolymer (Dow 512–R), and ½ part of tallow soap. The casein is salt peptized with ammonium nitrate according to the Patent No. 3,081,182. The coating after being applied by an air knife coater is gelled by being passed through a formic acid bath according to Patent No. 3,078,181 before it reaches the casting drum. About 12 pounds, dry weight, is applied.

In cases where a slightly lower finished gloss is acceptable, the cast coating can be replaced by a different intermediate coating applied to one side of the base coated web by an air knife coater in amount equivalent to 10 pounds per ream, dry weight. This coating can be an aqueous composition of about 42% solids containing 100 parts clay, 1½ parts TSPP, 13 parts soy protein and 13 parts butadiene-styrene copolymer (Dow's 512–R latex). After being coated, the web is dried and then supercalendered to a good smooth finish in conventional fashion.

To the very smooth coated surface resulting from casting or supercalendering is applied a layer of release coating composition in a volatile solvent by means of a reverse roll coater, in the amount of 6 to 8 pounds, e.g., 7 pounds, dry weight per ream, following which the coating is dried and cured for about a half minute in a high velocity drier having an exit temperature of about 500° F.

The release coating composition contains the following in parts by weight:

| Active ingredients: | Parts by wt. |
|---|---|
| Melamine resin | 30 |
| Alkyd resin | 70 |
| Para-toluene sulfonic acid | 1.5 |
| Silicone resin | 4.2 |
| Silicone resin catalyst | 4.2 |
| | 109.9 |

| Volatile solvents: | Parts by wt. |
|---|---|
| Xylol | 56.6 |
| Butanol | 14.5 |
| MEK (methyl ethyl ketone) | 25.0 |
| Hexane | 75.0 |
| | 171.1 |

The composition is prepared by simple mixing of the raw materials as supplied. Preferably the silicone resin catalyst is added last because it starts the polymerization of the silicone resin as soon as it is added. The pot life of the release coating composition will normally be in the range of 10 to 16 hours.

The melamine resin is a melamine-formaldehyde resin supplied as a 60 weight percent solution in equal parts of xylol and butanol. The sulfonic acid is the catalyst for the melamine resin and is added as a 25 weight percent solution in butanol.

The silicone resin is a curable liquid polymethyl siloxane (Dow Corning Syl-off 1107). The silicone resin catalyst is liquid tin octoate (Dow Corning Catalyst 23A).

The MEK and hexane act as diluents to bring the solids content and the viscosity of the composition down to coatable values. The desired viscosity lies between 70 and 100 centipoises. Neither MEK or hexane can be used as sole diluent without making the composition cloudy. When mixed in ratios falling between 1:2 and 1:4 of MEK:hexane, the mixture can be added in any desired quantity without causing cloudiness. The ratio of 1:3 is about optimum.

The silicone resin is soluble in the hexane but not in the MEK in the presence of the melamine and alkyd resins, which are soluble in the MEK. Since the hexane has about a 10° C. lower boiling point than the MEK, it volatilizes at a greater rate than the MEK during the drying of the coating with the result that the silicone resin comes out of solution first. It has been found that sufficient of the silicone resin blooms to the surface to give the desired release properties to the coating, probably because of its incompatibility with the melamine-alkyd resins. The use of 5 parts by weight of the silicone resin to 100 parts by weight of the melamine and alkyd resins is about the maximum, as greater amounts do not improve the release properties of the coating. An amount below about 2 parts per 100 parts of the other resins is about the minimum as the release properties of the coating with respect to urethanes decrease markedly when amounts below this level are used.

The above described sheet can be used as a release carrier web to cast a polyurethane dissolved in a solvent such as ethyl acetate to make a solution of about 30% concentration, which solution is applied to the web by a blade coater adapted to handle solvent coating compositions. Enough solution is applied to yield a film of from 1 to 5 mils in thickness after the solvent has been evaporated. Solvent is removed by drying at about 220° F. While a clear polyurethane film can be cast if desired, the film preferably contains some coloring matter such as dyestuff or pigment. A weight of pigment equal to the weight of polyurethane can be included. The resulting film readily strips from the carrier web as a self-supporting film. Alternatively, the film while still on the carrier web can have its exposed face adhered to a web of fabric or other material and thereafter the carrier web may be separated therefrom. In either case the side of the polyurethane film released from the carrier web has a finish substantially mirroring the surface of the carrier web.

Although the product of the invention was developed specifically to fill the need for a releasing carrier web for the production of polyurethane film with any desired degree of high gloss, it has likewise been found useful in production of high-gloss melamine-resin-surfaced panels. Such panels are made on a variety of bases, such as plywood, composition board, or the like. They are similar, however, in having a top surface made up of layers of fabric or paper saturated with partially condensed resin. The top layer is usually a sheet of alpha-cellulose paper saturated with partially condensed melamine-formaldehyde reaction product. The laid-up pile is usually placed in a platen press where it is subjected to heat and pressure to cure the resin. Pressures of up to 1000 pounds per square inch are commonly used at temperatures of about 310° F. for about 30 minutes. The release-coated web of the invention makes a superior liner for the platen of the press to ensure the desired degree of gloss in the finished panel and at the same time, freedom from sticking of the panel to the liner or platen.

Urea-formaldehydes and triazine-formaldehydes resins (Rohm & Haas Uformites F-200E, F-240, MM-57, MX-61 and M-211, see Technical Bulletin "Uformite," 1959) have also been used with satisfactory results. Any one of several oxidizing or non-oxidizing alkyd resins can be used to plasticize the amine-formaldehyde resin (e.g., Rohm & Haas Duraplex A-29, A-27, HD-78 and ND-76). The weight ratio of alkyd plasticizer to resin will normally be in the range of about 4:1 to 1:1.

The amount of amine-formaldehyde resin in the coating solution will usually be in the range of 8 to 16 weight percent, and the total solids content of the coating will be in the range of 20 to 45 weight percent.

The actual concentration of solids in the coating composition may vary widely depending upon the dry weight of coating film desired and upon the particular type of coating machine being used to apply the composition.

The above coating composition is unpigmented and has a high gloss. The gloss of the coating can, however, be readily controlled from a high to a low gloss by the use of flatting agents such as silica in combination with controlling the degree of gloss imparted to the base coating.

Having described this invention, what is sought to be protected by Letters Patent is succinctly set forth in the following claims.

We claim:

1. In a process for preparing a release paper suitable for casting urethanes thereon, wherein a paper sheet having a smooth clay-adhesive base coating is top coated with a solvent solution of first and second incompatible film forming polymerizable resins dissolved in a solvent mixture with the top coating thereafter being heated to dry and cure the top coating; the improvement wherein said solvent solution comprises a polymerizable amine-formaldehyde-alkyd resin and a polymerizable polysiloxane resin, in a homogeneous mixture of at least two solvents with one of said solvents being substantially more volatile than the other and the polymerizable polysiloxane resin being soluble in the more volatile solvent and substantially insoluble in the less volatile solvent while the polymerizable amine-formaldehyde-alkyd resin is soluble in the less volatile solvent; whereby heating the coating to evaporate the more volatile solvent causes the polysiloxane resin to bloom to the surface of the coating with said polysiloxane resin being employed in an amount by weight with respect to the amine-formaldehyde-alkyd resin sufficient to impart release properties to the top coat and insufficient to substantially affect the gloss and hardness thereof.

2. The process of claim 1 wherein said solvent solution contains a third mutually compatible solvent.

3. The process of claim 1 wherein said solvent solution also contains dissolved therein a polymerization catalyst for the amine-formaldehyde-alkyd resin and a polymerization catalyst for the polysiloxane resin.

4. The process of claim 1 wherein the solvent for the polysiloxane resin is a lower alkane and the solvent for the amine-formaldehyde-alkyd resin is a ketone.

5. In a release paper having a top coating of a cured film-forming synthetic resinous polymer cast on a clay-adhesive coated base sheet from a solvent solution, the improvement wherein said top coating comprises an admixture of a polymerized amine-formaldehyde-alkyd resin and a polymerized polysiloxane resin with the weight ratio of the polysiloxane resin to the alkyd resin being substantially greater at the release surface of said top coating than the weight ratio of the polysiloxane resin to alkyd resin in the portion of the top coating adjacent to the base sheet.

6. The release paper of claim 5 wherein said top coating is pigmented with the amount of pigment present being used to control the gloss thereof.

7. The process claimed in claim 1 wherein the polysiloxane resin is employed in an amount equivalent to from about 2 to about 5 parts per 100 by weight of the amine-formaldehyde-alkyd resins.

References Cited

UNITED STATES PATENTS

| | | | |
|---|---|---|---|
| 2,565,491 | 8/1951 | Francis | 161—89 |
| 2,869,722 | 1/1959 | Marander et al. | 117—155 X |
| 2,913,355 | 11/1959 | Collins | 117—68.5 |
| 3,230,289 | 1/1966 | Eder et al. | |
| 3,335,017 | 8/1967 | Spencer. | |

WILLIAM D. MARTIN, Primary Examiner

R. HUSACK, Assistant Examiner

U.S. Cl. X.R.

117—5.1, 68, 155, 161